`2,904,389`

COMPOSITION OF MATTER USEFUL IN RENDERING CELLULOSE RESISTANT TO CREASING AND WRINKLING

Robert M. Thomas, Tonawanda, and George M. Wagner, Lewiston, N.Y., assignors to Olin Mathieson Chemical Corporation, a corporation of Virginia No Drawing. Application December 9, 1958
Serial No. 779,057

7 Claims. (Cl. 8—116.3)

This invention relates to a novel composition of matter useful in the textile finishing industry. More particularly it relates to a solid mixture of particular ingredients useful for imparting wrinkle resistance to cellulosic textiles.

The utility of the dissolved compositions of this invention is demonstrated, for example, in copending application Serial Nos. 731,146 and 731,147, filed April 28, 1958, of Robert L. Holbrook and Richard L. Doerr, wherein creaseproofing agents comprising reaction products of dibasic acid hydrazides and formaldehyde are described. These creaseproofing agents are reaction products of one mole of a dihydrazide having the formula $R''(CONHNH_2)_2$ with from 4 to 20 or more moles of formaldehyde (preferably 6 to 15 moles of formaldehyde), wherein $R''$ is an alkylene group, preferably polymethylene, which can be interrupted by one or more oxygen or sulfur atoms. The reaction goes smoothly in aqueous solution at an alkaline pH and at room temperature or higher. The dilute polymethylol dihydrazide solution so obtained can be padded onto cellulosic textiles and cured in the conventional manner; alternatively the solution can be made acidic for a short time and a catalyst added thereto. More durable results are generally obtained by the latter method. Thus, the steps include preparation of the solution of dihydrazide-formaldehyde reaction product at an alkaline pH, acidification of the solution with hydrochloric acid for example, neutralization of the acid after a short period to return the solution to a basic condition for example with caustic, addition of a catalyst such as magnesium chloride to the solution, and finally padding the solution onto a cellulosic textile and curing the textile. This procedure produces a durable, creaseproofed finish which is not chlorine retentive, i.e., the cloth can be bleached without fiber degradation resulting from available chlorine being retained thereon. No prior commercial material has been successful in this respect.

Although the process described above produces excellent results, it is in some respects disadvantageous for the textile finisher. The finisher must prepare the reaction product by adding a weighed amount of a dihydrazide to an aqueous formaldehyde solution of known concentration. This product cannot be stored for any appreciable time since dilute solutions of polymethylol dihydrazides gradually lose their creaseproofing ability due to polymerization and hydrolysis. On sufficiently long standing, the polymers will solidify and precipitate thereby destroying the creaseproofing value of the solution. Because of this situation the hydrazide-formaldehyde reaction product must be prepared at or near the textile finishing mill, and must be used within several days.

The utility of the dissolved compositions of this invention is also demonstrated in copending application Serial No. 779,058, filed December 9, 1958, of Richard L. Doerr and Robert L. Holbrook, wherein creaseproofing agents comprising reaction products of monobasic acid hydrazides and formaldehyde are described. These agents are reaction products of about 4 to 20 moles of formaldehyde with one mole of a monohydrazide of the formula $RCONHNHR'$, wherein R is hydrogen, alkyl or substituted alkyl and R' is hydrogen or

They are used in essentially the same manner as the dihydrazide agents. The monohydrazide creaseproofing agents are more stable than the dihydrazide agents in aqueous solution but they still are prepared by the textile finisher because of shipping problems and desirability of a fresh solution.

It has now been discovered that several of the steps and disadvantages of the above-described procedures can be eliminated if zinc or magnesium oxide, carbonate, or hydroxide is admixed with paraformaldehyde and a suitable monohydrazide or dihydrazide.

The compositions of this invention comprise a solid mixture of about 1 mole of a monohydrazide or dihydrazide, about 4 to 20 moles of formaldehyde (as paraformaldehyde) and about 2 to 15 weight percent based on the total composition of an oxide, hydroxide or carbonate of zinc or magnesium. The compositions are prepared by simply admixing the solid ingredients.

The term paraformaldehyde refers to the linear polymer $(CH_2O)_n$ wherein $n$ is believed to be about 10. This substance is a solid which dissolves in water to produce formaldehyde.

The monohydrazides of the compositions have the formula $RCONHNHR'$ wherein R is H or an alkyl or substituted alkyl group and R' is H or

The R of the formula and the R of the R' group can be the same or different. Preferably, the alkyl group contains from 1 to 8 carbon atoms and the substituted alkyl group is substituted by hydroxyl or sulfhydryl groups. Examples of preferred monohydrazides include diformic hydrazide, acetic hydrazide, diacetic hydrazide, glycolic hydrazide, thioglycolic hydrazide, propionic hydrazide, and gluconic hydrazide.

The dihydrazides of the compositions have the formula $R''(CONHNH_2)_2$ wherein $R''$ is $(-CH_2-)_n$ wherein $n$ is 0 to 5 or $R''$ is a saturated chain of 2 to 6 carbon atoms interrupted by 1 or 2 oxygen or sulfur atoms in the form of ether or thioether linkages. Examples of dihydrazides wherein $R''$ is $(-CH_2-)_n$ include oxalic, malonic, succinic, glutaric, adipic and pimelic dihydrazides. Examples of dihydrazides wherein R is alkylene interrupted by oxygen and sulfur include diglycolic dihydrazide $CH_2OCH_2(CONHNH_2)_2$ and thiodiglycolic dihydrazide $CH_2SCH_2(CONHNH_2)_2$ and dihydrazides wherein R is $-CH_2O(CH_2)_2OCH_2-$. Mixtures of such dihydrazides can be used.

In order to use the novel composition it is mixed with 3 to 15 times its weight of water to make an aqueous solution containing about 5 to 25 percent by weight of the creaseproofing agent. The exact dilution will depend upon the final add-on or dry pick-up desired. During the dissolution of the dihydrazide and the formaldehyde, the pH must be maintained in the range of 6 to 11 to prevent polymerization of the polymethylol hydrazide compound. It is also preferable to maintain the pH at about 7 to 10, preferably 7 to 9, when a monohydrazide is used to prevent formation of resinous products. In this step the basic oxide serves its first purpose, i.e., buffering the solution at the required pH. The temperature is preferably maintained at about 10 to 50° C. although lower or higher temperatures can be used.

After the composition is thoroughly mixed with water it is neutralized with hydrochloric acid to a pH of about 7 and padded on to the cloth by conventional methods. During the neutralization, the basic oxide or hydroxide serves its second purpose by forming the soluble metallic chloride which later serves as the catalyst for promoting the reaction between the polymethylol dihydrazide and the cellulose.

An optional step before padding comprises further acidification of the aqueous mixture with hydrochloric acid to a pH of about 4 to 7. This pH is desirably maintained for up to 10 minutes when those dihydrazides not having an ether or thioether linkage interrupting the polymethylene chain are present, and up to 48 hours when those dihydrazides having the ether or thioether linkage are employed. This technique produces an antiwrinkling agent which is somewhat more durable i.e. resistant to washing.

After this acid-souring period, the pH of the solution is preferably returned to neutral or slightly alkaline before padding. This can be done with any suitable base, however it is advantageous to use the oxides, carbonates or hydroxides of zinc or magnesium. In this way an additional advantage is realized, since no alkali metal chlorides are formed as would be if sodium hydroxide, for example, was used in the neutralization step. Such salts are believed to have a deleterious effect on textiles during the curing step. When the acid is neutralized, the solution is ready to be applied to cloth. This can be done by means of a conventional textile padder. For ordinary cotton textiles a dry add-on of 5 to 15% is preferable; however more can be applied if desired. Linen, for example, may require an add-on of 20% or more for good results. The cloth is then dried and cured by conventional means, for example 2 minutes in a curing oven at 350 to 400° F.

The compositions of this invention have several advantages over the prior procedure of applying a hydrazideformaldehyde reaction product to textiles. Thus, the reaction of the hydrazide with the formaldehyde can be carried out without requiring attention to and adjustment of the pH during the addition of one to the other in aqueous solution. Furthermore the textile finisher does not have to calculate, weigh, and add the catalyst to the padding solution, as the former is automatically formed in the proper amount during neutralization or acidification with hydrochloric acid. Thirdly, the production of unwanted salts in the padding bath is lessened, and can be completely avoided if the pH is finally adjusted with an oxide or hydroxide of the elements named above.

The zinc or magnesium compound should be present in the dry mixture in an amount which will give a final concentration of catalyst (as the metal chloride) of about 5 to 15 percent by weight based on the weight of the hydrazide and formaldehyde content. Other percentages of catalyst are operable; however it is found that this is a preferred range.

The following examples further illustrate this invention:

*Example 1*

A mixture comprising 65 grams of diglycolic dihydrazide, 72 grams of paraformaldehyde and 5.8 grams of magnesium oxide was milled for 2½ hours in a ball mill. The homogeneous composition was stored in a glass jar at 25°–30° C.

Sixteen grams of the mixture was withdrawn from the bottle shortly after mixing and stirred with 134 milliliters of distilled water. The pH of the mixture was about 9. After one hour sufficient hydrochloric acid was added to bring the pH to about 4, and then after a period of 5 minutes the pH was raised to 7 by the slow dissolution of magnesium oxide in the solution.

The mixture prepared as described above was padded onto Indian Head cotton having an initial crease angle of 78°. The crease angle was determined (AATCC tentative test method 66–53) by folding the cloth in half under slight pressure and measuring the angle between the halves after releasing the pressure. Thus, the angle of 180° represents the maximum angle obtainable, i.e. the cloth recovered completely and is flat. The wet pick-up was 77.1% by weight and the dry pick-up was 4.5% by weight after drying. After curing the cloth for 3 minutes at 400° F. the crease angle was found to be 122°.

When the above experiment was duplicated after storing the solid composition for 2 months the crease angle was found to be 120° C..

These results demonstrate the negligible loss in antiwrinkling properties of the compositions of this invention after a relatively long storage period.

*Example 2*

Solid compositions of the following formulations are prepared by the method of Example 1:

(A) | Grams
---|---
Formaldehyde (as paraformaldehyde) | 90
Adipic dihydrazide | 174
Zinc oxide | 36

(B) | 
---|---
Formaldehyde (as paraformaldehyde) | 60
Diglycolic dihydrazide | 162
Magnesium carbonate | 20

(C) | 
---|---
Formaldehyde (as paraformaldehyde) | 150
Adipic dihydrazide | 174
Magnesium hydroxide | 26

(D) | 
---|---
Formaldehyde (as paraformaldehyde) | 180
Thiodiglycolic dihydrazide | 176
Zinc carbonate | 40

(E) | 
---|---
Paraformaldehyde | 240
Acetic hydrazide | 75
Magnesium oxide | 10

(F) | 
---|---
Paraformaldehyde | 180
Glycolic hydrazide | 91
Zinc oxide | 30

(G) | 
---|---
Paraformaldehyde | 300
Propionic hydrazide | 89
Magnesium hydroxide | 25

The solid mixtures A to D are useful to prepare solutions useful in crease-proofing as in Example 1. The solid mixtures E to G are useful to prepare solutions useful in crease-proofing as in Example 3.

*Example 3*

After storing composition (E) of Example 2 for 13 weeks, it was tested to determine its ability to increase the wrinkle resistance of a cellulosic fabric. Twenty grams of the composition was mixed with 200 grams of water and the mixture was acidified to a pH of about 7 and padded on to a cotton broadcloth having an original crease angle of 70°. The cloth was dried at about 200° F. and then heated in an oven at 360° F. for 4 minutes. The weight of the cloth increased 5.5% due to its polymethylol acetic hydrazide content. The crease angle of the fabric after scouring it in a hot aqueous solution of sodium carbonate and a nonionic detergent commercially available at Polytergent J–300 was 125° as determined by AATCC tentative test method 66–53.

What is claimed is:
1. A composition of matter useful in the impregnation of a textile fabricated from a material selected from the group consisting of cellulose and regenerated cellulose to render it resistant to creasing and wrinkling consisting essentially of a solid mixture of (1) about 4 to 20 moles of formaldehyde as paraformaldehyde; (2) about 1 mole of a hydrazide selected from the group consisting of a monohydrazide of the formula RCONHNHR' and a dihydrazide of the formula R''(CONHNH$_2$)$_2$; and (3) about 2 to 15 percent by weight based on the total composition of a metal compound selected from the group consisting of zinc oxide, zinc hydroxide, zinc carbonate, magnesium oxide, magnesium hydroxide and magnesium carbonate; R in the monohydrazide being selected from the group consisting of hydrogen, alkyl of 1 to 8 carbon atoms and alkyl of 1 to 8 carbon atoms substituted with at least one of the groups hydroxyl and sulfhydryl, R' in the monohydrazide being selected from the group consisting of hydrogen and

and R'' in the dihydrazide being selected from the group consisting of (—CH$_2$—)$n$ wherein $n$ is 0 to 5 and alkylene containing from 2 to 6 carbon atoms interrupted by from 1 to 2 atoms selected from the group consisting of oxygen and sulfur.

2. The composition of claim 1 in which the dihydrazide is diglycolic dihydrazide and the metal compound is magnesium oxide.

3. The composition of claim 1 in which the dihydrazide is adipic dihydrazide and the metal compound is zinc oxide.

4. The composition of claim 1 in which the dihydrazide is diglycolic dihydrazide and the metal compound is magnesium carbonate.

5. The composition of claim 1 in which the dihydrazide is adipic dihydrazide and the metal compound is magnesium hydroxide.

6. The composition of claim 1 in which the monohydrazide is acetic hydrazide and the metal compound is magnesium oxide.

7. An aqueous solution of the composition of claim 1 containing about 5 to 25 weight percent of the formaldehyde and hydrazide components.

References Cited in the file of this patent
UNITED STATES PATENTS

| | | |
|---|---|---|
| 2,161,808 | Finlayson | June 13, 1939 |
| 2,845,400 | Rudner | July 29, 1958 |